US012240294B2

(12) United States Patent
Johansen et al.

(10) Patent No.: US 12,240,294 B2
(45) Date of Patent: Mar. 4, 2025

(54) FLUID DISTRIBUTION DEVICE

(71) Applicant: GENTHERM GMBH, Odelzhausen (DE)

(72) Inventors: Thomas Johansen, Kirchseeon (DE); Dan Botez, Augsburg (DE); Jeffery Steven Arsenault, Plymouth, MI (US)

(73) Assignee: GENTHERM GMBH, Odelzhausen (DE)

( * ) Notice: Subject to any disclaimer, the term of this patent is extended or adjusted under 35 U.S.C. 154(b) by 394 days.

(21) Appl. No.: 17/617,987

(22) PCT Filed: Jul. 8, 2020

(86) PCT No.: PCT/DE2020/000151
§ 371 (c)(1),
(2) Date: Dec. 10, 2021

(87) PCT Pub. No.: WO2021/004565
PCT Pub. Date: Jan. 14, 2021

(65) Prior Publication Data
US 2022/0305880 A1    Sep. 29, 2022

(30) Foreign Application Priority Data
Jul. 8, 2019    (DE) .................... 10 2019 004 683.8

(51) Int. Cl.
*B60H 1/00*    (2006.01)
(52) U.S. Cl.
CPC ..... *B60H 1/00685* (2013.01); *B60H 1/00285* (2013.01); *B60H 2001/003* (2013.01)

(58) Field of Classification Search
CPC ............ B60H 1/00685; B60H 1/00285; B60H 2001/003
USPC ........................................................ 454/120
See application file for complete search history.

(56) References Cited

U.S. PATENT DOCUMENTS

| 3,190,584 A | 6/1965 | Gire et al. |
| 10,330,208 B2 * | 6/2019 | Takamatsu ............... F16K 27/06 |
| 2017/0254425 A1 | 9/2017 | Takamatsu et al. |
| 2018/0361894 A1 * | 12/2018 | Wolf ..................... B60N 2/5657 |
| 2019/0054793 A1 | 2/2019 | Fujii et al. |

FOREIGN PATENT DOCUMENTS

| DE | 4447135 A1 * | 7/1995 | ......... B60H 1/00685 |
| DE | 102008025059 A1 | 12/2008 | |
| DE | 102009004157 B3 | 4/2010 | |
| DE | 102009032599 A1 * | 1/2011 | ......... B60H 1/00685 |
| DE | 102010037148 A1 | 3/2012 | |
| DE | 102017205135 A1 | 9/2018 | |

(Continued)

OTHER PUBLICATIONS

International Search Report and Written Opinion mailed on Nov. 2, 2020, for International Application PCT/DE2020/000151.

*Primary Examiner* — Allen R. B. Schult
(74) *Attorney, Agent, or Firm* — The Dobrusin Law Firm, P.C.

(57) ABSTRACT

A fluid distribution device that includes a distributor housing having at least one fluid inlet opening and at least one fluid outlet opening; and at least one rotary, elongated hollow element having a wall that has one or more fluid-passage openings, a fluid flow through the distributor housing is changed by rotating the at least one hollow element.

17 Claims, 4 Drawing Sheets

(56) References Cited

FOREIGN PATENT DOCUMENTS

| EP | 2243646 | A1 | * | 10/2010 | ......... | B60H 1/00685 |
|----|---------|----|---|---------|-----------|--------------|
| FR | 2696382 | A1 | * | 4/1994  | ......... | B60H 1/00685 |
| GB | 2324600 | A  | * | 10/1998 | ......... | B60H 1/00064 |

* cited by examiner

FLUID DISTRIBUTION DEVICE

CROSS REFERENCE TO RELATED APPLICATIONS

This application is a US National Phase of PCT/DE2020/000151 filed Jul. 8, 2020, which claims priority to DE 10 2019 004 683.8 filed Jul. 8, 2019, both of which are hereby incorporated by reference herein for all purposes.

FIELD

These teachings relate to a fluid distribution device having a distributor housing, the distributor housing having at least one fluid inlet opening and at least one fluid outlet opening; to a seat ventilation system having at least one seat, which has one or more ventilation zones, and a feed device set up to provide an air flow to the one or more ventilation zones of the at least one seat; and to a vehicle having a seat ventilation system.

BACKGROUND

In particular, only a limited amount of installation space is regularly available when using fluid distribution devices in vehicles. Corresponding fluid distribution devices must consequently be designed to save as much space as possible.

However, construction space-saving designs often do not have suitable control options for the fluid flow, so that the use of side designs is ruled out for a large number of areas of application. Known fluid distribution devices also often generate a comparatively high counter pressure, so that comparatively powerful flow generators must be used. This leads to an increase in manufacturing costs and increased energy consumption.

In addition, there is a need for fluid distribution devices which can be controlled or actuated both manually and by motor.

SUMMARY

The object on which the invention is based is thus to reduce the installation space required for the fluid distribution without excessively restricting options for controlling the fluid flow.

The object is achieved by a fluid distribution device of the type mentioned above, the fluid distribution device according to the invention comprising at least one rotary, elongated hollow element, the wall of which has one or more fluid-passage openings, the fluid flow through the distributor housing being variable by rotating the at least one hollow element.

The invention makes use of the knowledge that elongated hollow elements, the walls of which have one or more fluid-passage openings, can be used as rotatable valve cores for changing the fluid flow through a distributor housing. The fluid distribution device can thus be used as a fluid valve, the rotary actuation of the elongated hollow element enabling a compact construction and a flat design, which can also be thermally insulated comparatively well. The at least one hollow element can be rotated manually or by motor, so that the fluid distribution device according to the invention can be used both in a manual control design and in conjunction with a motor control. Manual control in this case can be implemented, for example, via a rotary knob, the rotary knob being connected to the hollow element or being an integral part of the hollow element. Motor control can be implemented, for example, via an electric motor which is connected to the at least one hollow element.

The fluid distribution device according to the invention can be used for distributing gases, gas mixtures and/or liquids. In particular, the fluid distribution device can be used as an air distribution device. The fluid distribution device is preferably set up to be used as an air distribution device for a vehicle seat.

The fluid distribution device according to the invention generates a comparatively low counter pressure during operation and simultaneously allows a high fluid flow rate. Furthermore, turbulence within the distributor housing is prevented or at least considerably reduced. The distributor housing of the fluid distribution device can be designed in one piece or in a plurality of pieces. In particular, the distributor housing has a receiving body in which the at least one hollow element is inserted. The receiving body of the distributor housing can be closed with a housing cover.

In another preferred embodiment of the fluid distribution device according to the invention, the free flow cross-section of the one or more fluid-passage openings of the at least one hollow element available for the fluid flow can be changed by rotating the at least one hollow element. The one or more fluid-passage openings of the at least one hollow element can preferably be rotated into or out of a flow path by rotating the at least one hollow element. The one or more fluid-passage openings of the at least one hollow element can preferably be brought into alignment with a cover by rotating the at least one hollow element, so that the cover reduces the free flow cross-section of the one or more fluid-passage openings of the at least one hollow element. The cover can be formed, for example, by the inner wall of the distributor housing. When there is a plurality of fluid-passage openings, flow division is determined by the free flow cross-section of all fluid-passage openings.

A fluid distribution device is also preferred in which the one or more fluid-passage openings are located in a circumferential outer surface of the at least one hollow element. In addition to the one or more fluid-passage openings in the circumferential outer surface of the at least one hollow element, one or more fluid-passage openings can also be located on the end face of the at least one hollow element. The fluid-passage openings can function as fluid inlet openings through which fluid can flow into the inner region of the hollow element and/or as fluid outlet openings through which fluid can flow out of the inner region of the hollow element.

In addition, a fluid distribution device according to the invention is preferred in which the at least one fluid outlet opening of the distributor housing can be shut off by rotating the at least one hollow element. The shutting-off of the at least one fluid outlet opening of the distributor housing prevents a fluid from flowing out of the at least one fluid outlet opening of the distributor housing out of the distributor housing. The at least one fluid inlet opening of the distributor housing can also be shut off by rotating the at least one hollow element. Shutting off the at least one fluid inlet opening of the distributor housing can prevent an inflow of a fluid through the at least one fluid inlet opening of the distributor housing into the distributor housing.

In a further development of the fluid distribution device according to the invention, the at least one hollow element is arranged in sections inside the distributor housing and in sections outside the distributor housing. The section of the at least one hollow element arranged inside the distributor housing has the one or more fluid-passage openings via which the fluid flow through the distributor housing can be changed. The section of the at least one hollow element arranged outside the distributor housing is preferably used for actuation, in particular for rotary actuation, of the at least one hollow element.

In addition, a fluid distribution device according to the invention which has a rotary actuation device is preferred. The rotary actuation device is preferably arranged at least partially outside of the distributor housing. The at least one hollow element can be rotated via the rotary actuation device. The rotary actuation device can be an integral part of the hollow element or be connected to the hollow element. The rotary actuation device can comprise a rotary handle or a rotary knob.

In a further preferred embodiment, the fluid distribution device according to the invention has a first rotary, elongated hollow element and a second rotary, elongated hollow element. The walls of the first hollow element and the second hollow element each have one or more fluid-passage openings, the fluid flow through the distributor housing being able to be changed by rotating the hollow element. The at least one fluid outlet opening of the distributor housing can be shut off by rotating the hollow element. The at least one fluid inlet opening of the distributor housing can be shut off by rotating the hollow element. The first hollow element and the second hollow element preferably run parallel to one another.

In a further development of the fluid distribution device according to the invention, the distributor housing has at least one first fluid outlet opening and at least one second fluid outlet opening, the fluid flow through the at least one first fluid outlet opening and the fluid flow through the at least one second fluid outlet opening being individually controllable by rotating the hollow elements. The fluid flow through the at least one first fluid outlet opening of the distributor housing can be controllable by rotating the first hollow element. The fluid flow through the at least one second fluid outlet opening of the distributor housing can be controllable by rotating the second hollow element. Different fluid flows can be tapped at the fluid distribution device in this way. A needs-based supply of fluid for different consumers or fluid receivers can be implemented in this way. Furthermore, excess fluid, for example, air, can also be discharged from the distributor housing through a fluid outlet opening of the distributor housing, so that the counter pressure is reduced and the vibrations and noises generated by the fluid distributor device are reduced.

In another embodiment of the fluid distribution device according to the invention, the at least one first fluid outlet opening of the distributor housing and the at least one second fluid outlet opening of the distributor housing can be shut off simultaneously and/or individually by rotating the hollow elements. The at least one first fluid outlet opening of the distributor housing can be shut off by the first hollow element in a rotational angle position of the first hollow element. The at least one second fluid outlet opening of the distributor housing can be shut off by the second hollow element in a rotational angle position of the second hollow element. With regard to the control of the fluid distribution device, an option is thus created whereby fluid can be provided only for individual consumers or fluid receivers connected to the fluid distribution device or for all consumers or fluid receivers connected to the fluid distribution device. If the fluid distribution device is used in a seat ventilation system, for example, only individual or all ventilation zones of a seat can be supplied with an air flow.

Blocking all of the fluid outlet openings in the distributor housing can also completely interrupt the fluid flow to the consumers or fluid receivers.

The fluid distribution device according to the invention is further advantageously developed in that the walls of the at least one hollow element have a plurality of axially spaced fluid-passage openings. The fluid-passage openings are preferably designed as wall windows of the hollow element. The at least one hollow element can be designed, for example, as a plastic part, in particular as a plastic injection-molded part. Furthermore, the distributor housing can be made of plastic in sections or entirely. The distributor housing preferably serves as a radial and/or axial bearing for the at least one hollow element. In particular, the at least one hollow element can be removed from the distributor housing in a non-destructive manner.

In a further preferred embodiment of the fluid distribution device according to the invention, the walls of the at least one hollow element have a pair or a plurality of pairs of opposite fluid-passage openings. The at least one hollow element preferably has a plurality of, for example, two, three, four or more than four axially spaced pairs of opposite fluid-passage openings. A material web extending in the circumferential direction is preferably located between axially spaced fluid-passage openings.

In addition, a fluid distribution device according to the invention is advantageous when it has at least one actuator, the at least one hollow element being rotatable by means of the at least one actuator. The actuator can be an electric, pneumatic or hydraulic actuator. The actuator is preferably an electric motor, in particular a stepper motor. The at least one hollow element can be rotated step by step or continuously using the actuator. The fluid distribution device preferably comprises one actuator per hollow element. In particular, the fluid distribution device has a control device by means of which the at least one actuator can be controlled. For example, the at least one actuator can be controlled by the control device as a function of the ambient temperature. Alternatively, or additionally, the control device can be set up to control the at least one actuator as a function of a set target temperature and/or a set ventilation intensity. The control device and the at least one actuator can be connected to one another via a bus system, in particular in a LIN bus system.

The object on which the invention is based is further achieved by a seat ventilation system of the type mentioned above, the feed device of the seat ventilation system according to the invention having a fluid distribution device according to any one of the embodiments described above. With regard to the advantages and modifications of the seat ventilation system according to the invention, reference is first made to the advantages and modifications of the fluid distribution device according to the invention.

The seat ventilation system can furthermore have a flow generator which is set up to generate the fluid flow fed to the fluid distribution device. The flow generator can be arranged at a distance from the distribution device. Alternatively, the flow generator can also be arranged directly on the fluid distribution device or in the fluid distribution device. The flow generator can be a fan. The air provided to the one or more ventilation zones via the feed device can be, for example, ambient air or pre-conditioned air. If the seat ventilation system is used in a vehicle, the ambient air can be air from the vehicle interior or air from the vehicle environment. The pre-conditioned air can be pre-tempered, that is, heated or cooled air. Furthermore, the pre-conditioned air can also have a reduced or increased air humidity.

In particular, the seat ventilation system has a temperature control device by means of which the air flow provided to the one or more ventilation zones is pre-tempered. The temperature control device can be a heating and/or cooling device. For example, the temperature control device can comprise one or more thermoelectric devices, for example, Peltier elements. The distribution device can also be connected in a fluid-conducting manner to ventilation zones of a plurality of seats. The air distribution to a plurality of seats, for example, to the driver's seat and the front passenger seat of a vehicle, can thus be implemented via just one fluid distribution device.

In a further preferred embodiment of the seat ventilation system according to the invention, the fluid distribution device is arranged and/or fastened in or on a cushion body of the at least one seat. For example, the fluid distribution device is arranged in the backrest or on the back side of the backrest. Alternatively, the fluid distribution device can also be arranged in the seat cushion or below the seat cushion of the seat.

The object on which the invention is based is further achieved by a vehicle of the type mentioned above, the seat ventilation system of the vehicle according to the invention having a fluid distribution device according to any one of the embodiments described above or the seat ventilation system being designed according to any one of the embodiments described above.

BRIEF DESCRIPTION OF THE DRAWINGS

Preferred embodiments of the invention are explained and described in more detail below with reference to the accompanying drawings. Shown are.

DETAILED DESCRIPTION

Figure 1:
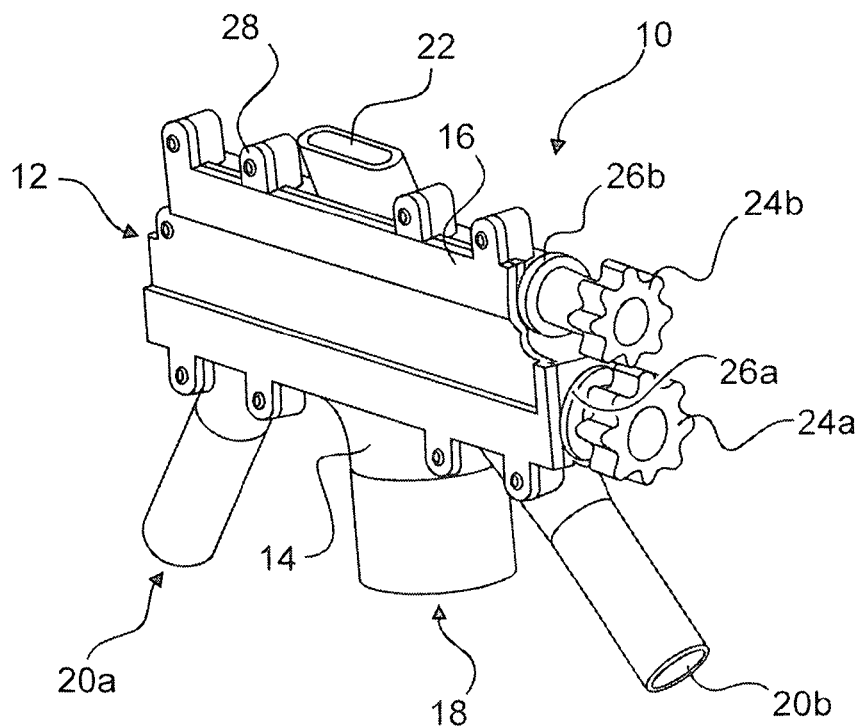
FIG. 1 an embodiment of the fluid distribution device according to the invention in a perspective illustration.

FIG. 1 shows a fluid distribution device 10 which can be used for dividing and controlling a fluid flow. The fluid distribution device 10 comprises a two-part distributor housing 12 made of plastic. The distributor housing 12 comprises a receiving body 14, the receiving body 14 being closed by means of fastening elements 28 with a housing cover 16. The fastening elements 28 can, for example, be screws, pins, or rivets.

The distributor housing 12 has a fluid inlet opening 18 and a total of 3 fluid outlet openings 20a, 20b, 22. The fluid outlet openings 20a, 20b are arranged on the same side of the distributor housing 12 as the fluid inlet opening 18, the fluid inlet opening 18 being positioned between the fluid outlet openings 20a, 20b. The fluid outlet opening 22 is arranged on the side opposite to the fluid inlet opening 18. The fluid flowing into the distributor housing 12 through the fluid inlet opening 18 is divided among the fluid outlet openings 20a, 20b, 22 depending on the state of the fluid distribution device 10.

Two rotary, elongated hollow elements 24a, 24b are inserted into the distributor housing 12, the walls 30a, 30b of which have a plurality of fluid-passage openings 32a, 32b, 34a, 34b, 36a, 36b, 38a, 38b, 40a, 40b, 42a, 42b, a rotation the hollow element 24a, 24b being able to change the fluid flow through the distributor housing 12. Rotating the hollow elements 24a, 24b can shut off the fluid outlet openings 20a, 20b, 22 simultaneously and/or individually. The hollow elements 24a, 24b are arranged in sections inside the distributor housing 12 and in sections outside of the distributor housing 12. The receiving body 14 of the distributor housing 12 has recesses for the hollow elements 24a, 24b, through which recesses the hollow elements 24a, 24b are inserted into the distributor housing 12. To seal the housing interior 44 of the distributor housing 12, seals 26a, 26b, which are designed as O-rings, are arranged between the hollow elements 24a, 24b and the receiving body 14.

Figure 2:
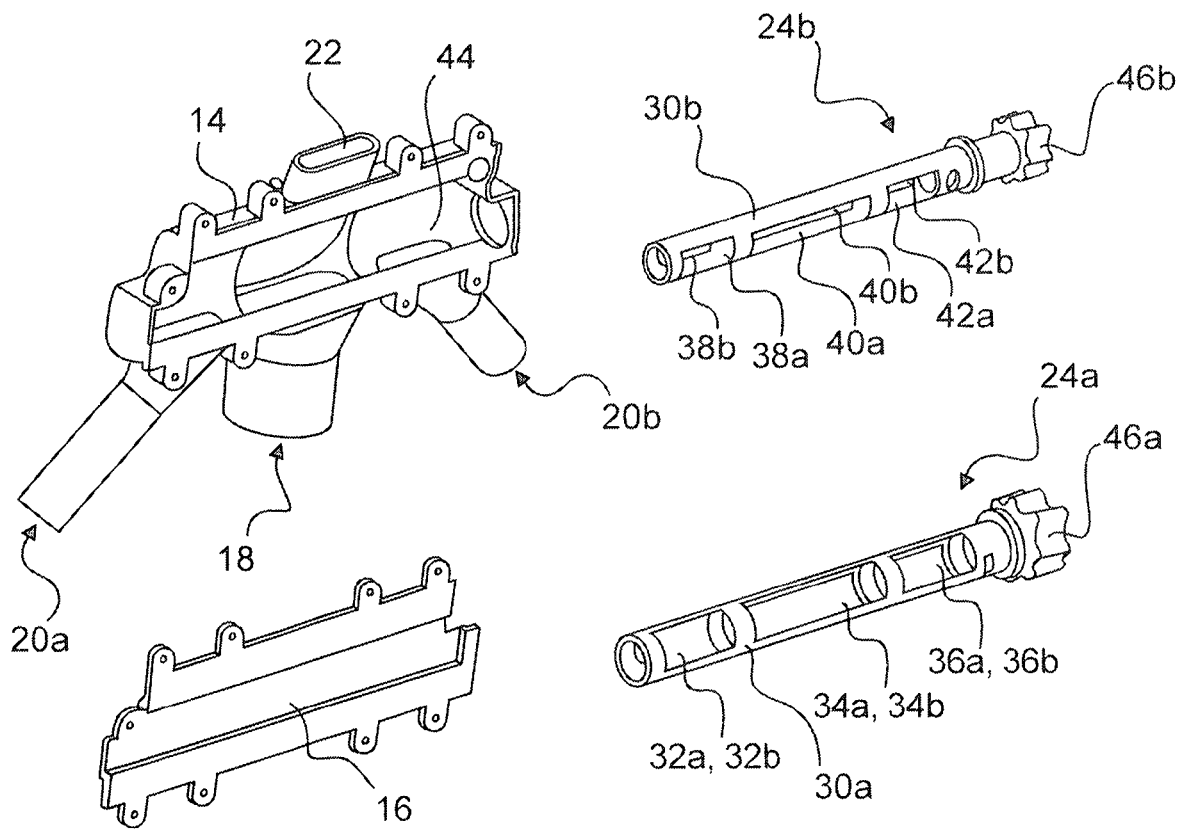
FIG. 2 an embodiment of the fluid distribution device according to the invention in an exploded illustration.

The exploded illustration of FIG. 2 shows that the fluid-passage openings 32a, 32b, 34a, 34b, 36a, 36b, 38a, 38b, 40a, 40b, 42a, 42b are located in circumferential outer surfaces of the hollow elements 24a, 24b. In addition, the hollow elements 24a, 24b have a fluid-passage opening on the end face.

The wall 30a of the hollow element 24a has three pairs of opposite fluid-passage openings 32a, 32b, 34a, 34b, 36a, 36b. The pairs of opposite fluid-passage openings 32a, 32b, 34a, 34b, 36a, 36b are arranged axially spaced from one another. The wall 30b of the hollow element 24b also has three pairs of opposite fluid-passage openings 38a, 38b, 40a, 40b, 42a, 42b, the pairs of opposite fluid-passage openings 38a, 38b, 40a, 40b, 42a, 42b also being axially spaced from one another.

The hollow elements 24a, 24b each have a rotary actuation device 46a, 46b, the rotary actuation device 46a, 46b being designed as a rotary handle and being arranged outside of the distributor housing 12. The hollow elements 24a, 24b can be rotated manually via the rotary actuation devices 46a, 46b. Furthermore, the rotary actuation devices 46a, 46b can each be connected to an actuator, for example, an electric motor, so that the hollow elements 24a, 24b can be rotated via the actuator.

The housing interior 44 of the distributor housing 12 connects the fluid inlet opening 18 to the fluid outlet openings 20a, 20b, 22 in a fluid-conducting manner when the hollow elements 24a, 24b are not used. The hollow elements 24a, 24b thus function as rotary valve cores, via which the fluid outflow through the fluid outlet openings 20a, 20b and the fluid outlet opening 22 can be controlled and shut off. The free flow cross-section of the fluid-passage openings 32a, 32b, 34a, 34b, 36a, 36b, 38a, 38b, 40a, 40b, 42a, 42b of the hollow elements 24a, 24b available for the fluid flow can be changed by rotating the hollow elements 24a, 24b. The fluid-passage openings 32a, 32b, 34a, 34b, 36a, 36b, 38a, 38b, 40a, 40b, 42a, 42b can be rotated into or out of a flow path by rotating the hollow elements 24a, 24b and/or can be brought in alignment with the inner wall of the distributor housing 12.

Figure 3:
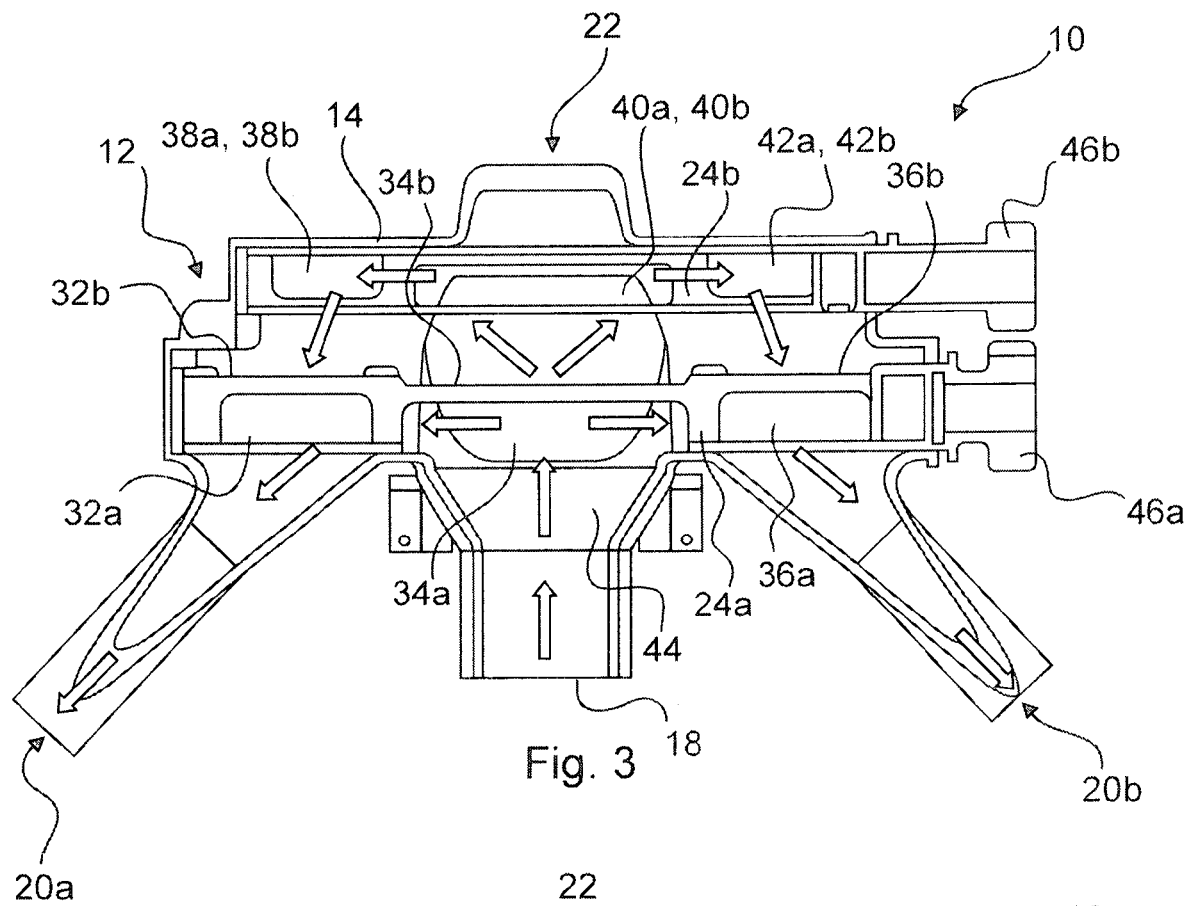
FIG. 3 an embodiment of the fluid distribution device according to the invention in a first state in a sectional illustration.
Figure 4:
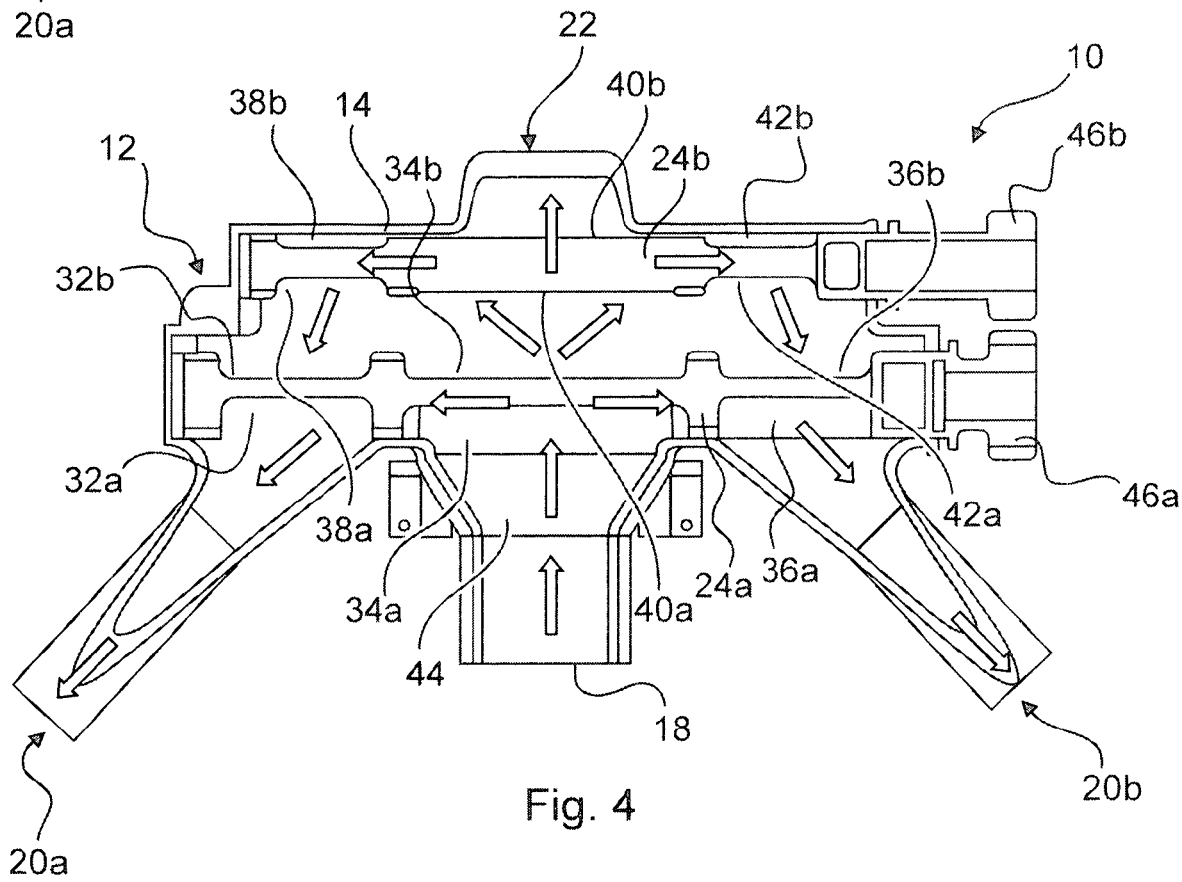
FIG. 4 the fluid distribution device depicted in FIG. 3 in a second state in a sectional illustration.
Figure 5:
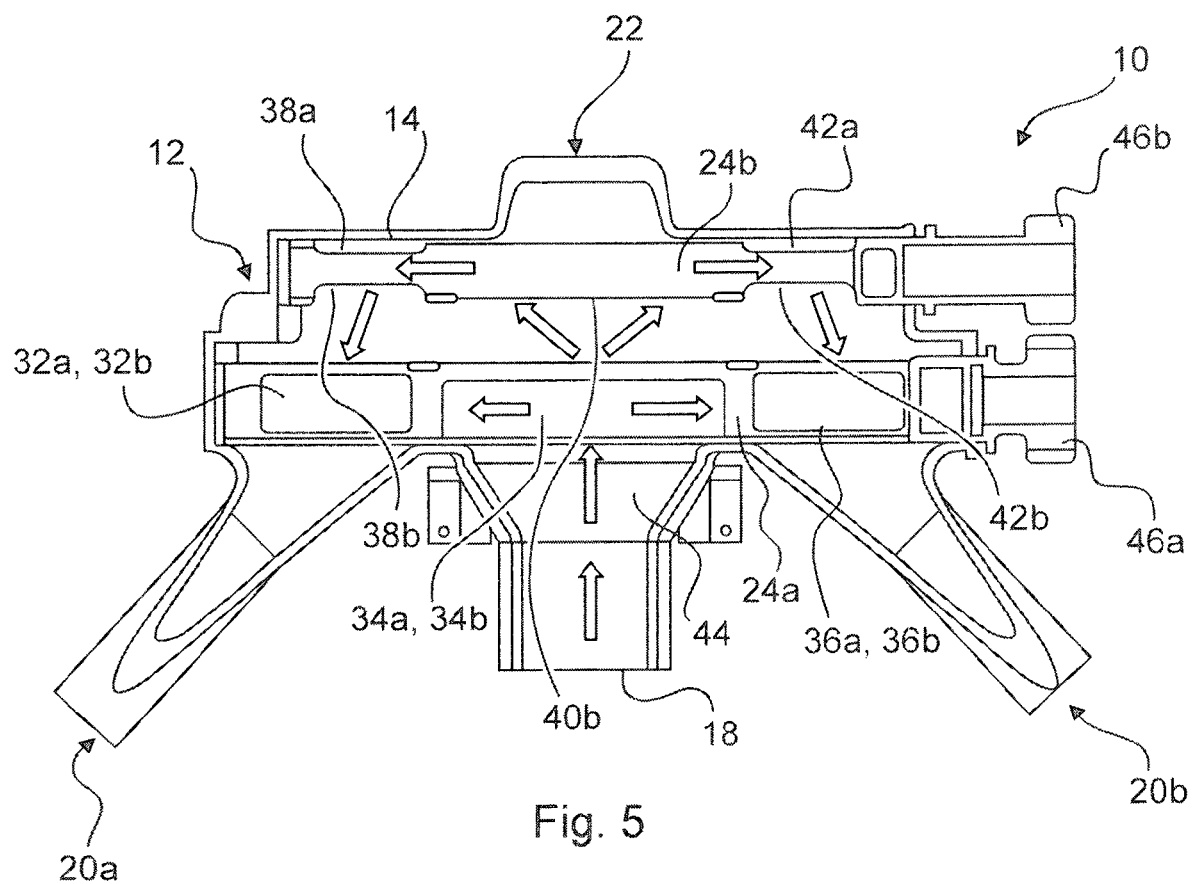
FIG. 5 the fluid distribution device depicted in FIG. 3 in a third state in a sectional illustration.

FIGS. 3 to 5 show that the first elongated hollow element 24a and the second elongated hollow element 24b run parallel to one another. The two first fluid outlet openings 20a, 20b are arranged on a first side of the hollow elements 24a, 24b. The second fluid outlet opening 22 is arranged on a second opposite side of the hollow elements 24a, 24b. The fluid flow through the two first fluid outlet openings 20a, 20b and the fluid flow through the second fluid outlet openings 22 can be controlled by rotating the hollow elements 24a, 24b. The fluid flow through the two first fluid outlet openings 20a, 20b can be interrupted by rotating the first hollow element 24a. The fluid flow through the second fluid outlet opening 22 can be interrupted by rotating the second hollow element 24b.

FIG. 3 shows a state of the fluid distribution device 10 in which an angle of rotation is set on the second hollow element 24b, which angle leads to the second hollow element 24b shutting off the second fluid outlet opening 22. A fluid introduced into the distributor housing 12 flows through the fluid inlet opening 18 into the housing interior 44 of the distributor housing 12. The fluid flowing in passes through the fluid-passage opening 34a into the interior of the hollow element 24a. The fluid flowing into the interior of the hollow element 24a is partially deflected laterally and partially leaves the interior of the hollow element 24a through the fluid-passage opening 34b. The fluid flowing through the fluid-passage opening 34b then reaches the interior of the hollow element 24b via the fluid-passage openings 40a, 40b of the hollow element 24b. Since no open flow path is released in the direction of the fluid outlet opening 22, the fluid flowing into the interior of the hollow element 24b is entirely deflected laterally. The laterally deflected fluid then leaves the interior of the hollow element 24b via the fluid-passage openings 38a, 38b and via the fluid-passage openings 42a, 42b and is subsequently introduced back into the interior of the hollow element 24a via the fluid-passage openings 32b, 36b. From there, the fluid reaches the fluid outlet openings 20a, 20b via the fluid-passage openings 32a, 36a, through which fluid-passage openings 32a, 36a the fluid then leaves the distributor housing 12.

The hollow elements 24a, 24b have different rotational angle positions in the state illustrated in FIG. 4. A flow path from the interior of the hollow element 24b in the direction of the fluid outlet opening 22 is now released due to the different rotational angle positions. In addition, flow paths are released between the interior of the hollow element 24a and the fluid outlet openings 20a, 20b. The fluid flowing in via the fluid inlet opening 18 thus leaves the distributor housing 12 both via the two first fluid outlet openings 20a, 20b and via the second fluid outlet opening 22.

In the state illustrated in FIG. 5, the first hollow element 24a has a rotational angle position in which the two first fluid outlet openings 20a, 20b are shut off by the first hollow element 24a. Furthermore, the second hollow element 24b has a rotational angle position in which the second fluid outlet opening 22 is shut off by the second hollow element 24b. The rotational angle positions of the hollow elements 24a, 24b thus cause a flow interruption in which fluid does not flow out of any of the fluid outlet openings 20a, 20b, 22.

Figure 6:
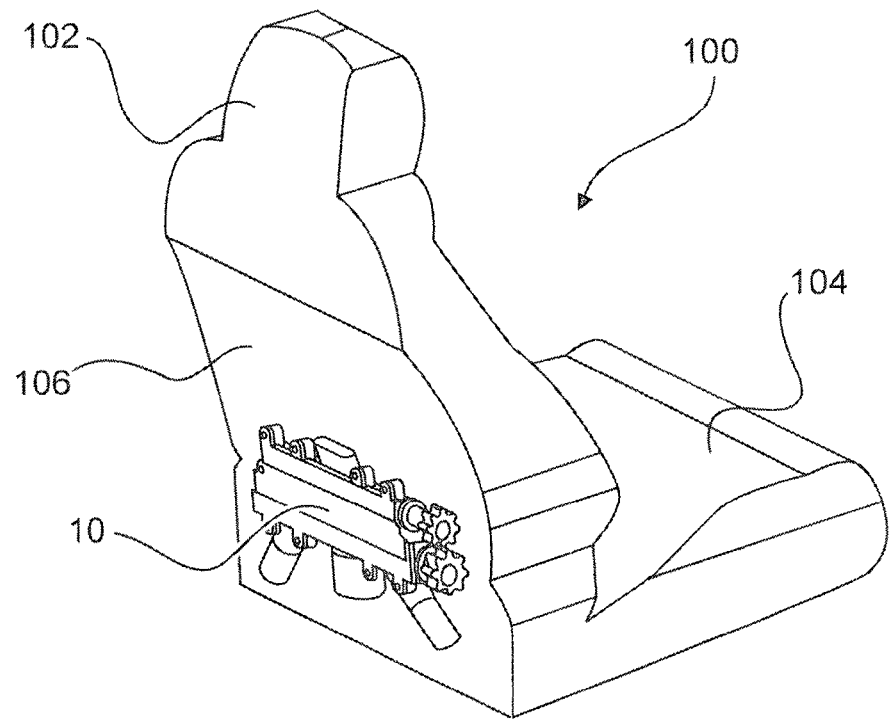
FIG. 6 an embodiment of the seat ventilation system according to the invention in a perspective illustration.

FIG. 6 shows a seat ventilation system 100 having a vehicle seat 102 which can have one or more ventilation zones. The seat ventilation system 100 further comprises a feed device via which an air flow can be provided to the one or more ventilation zones of the vehicle seat 102. The feed device comprises a fluid distribution device 10, the fluid distribution device 10 being arranged in a cushion body 106, namely in the backrest of the vehicle seat 102.

Figure 7:
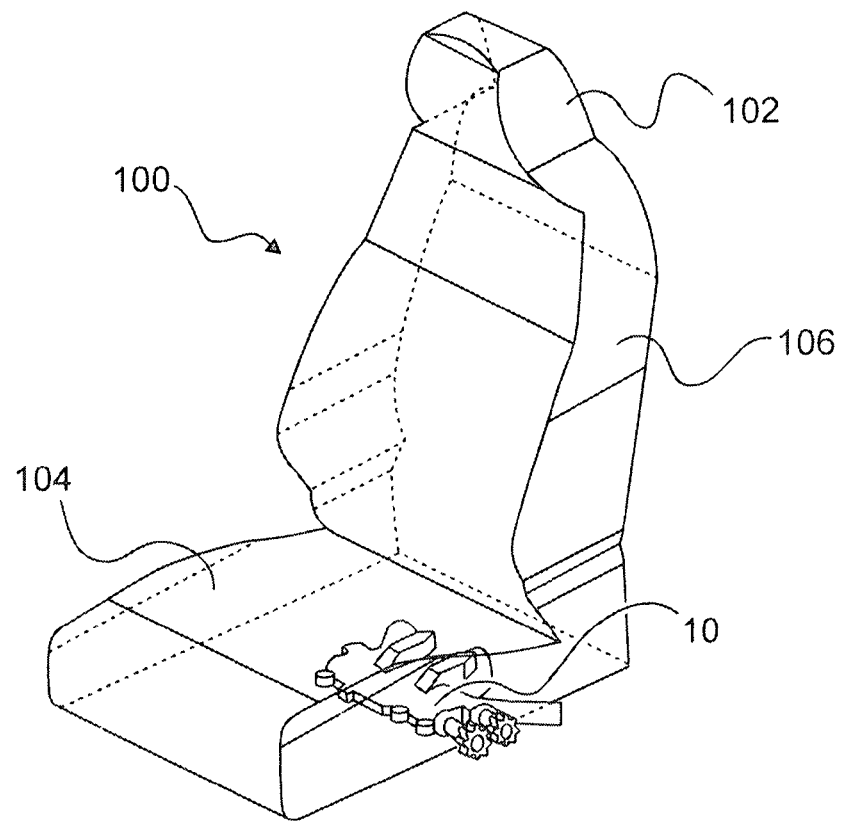
FIG. 7 a further embodiment of the seat ventilation system according to the invention in a perspective illustration.

FIG. 7 also shows a seat ventilation system 100 having a vehicle seat 102. In the embodiment illustrated, the fluid distribution device 10 of the feed device is arranged below a cushion body 104, namely below the seat cushion, of the vehicle seat 102.

Figure 8:
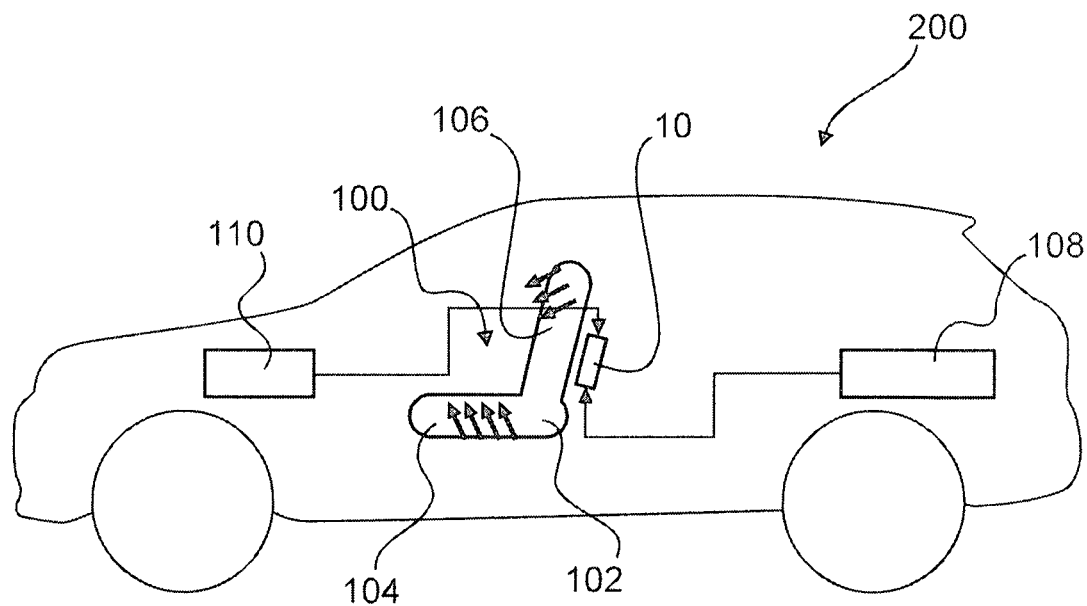
FIG. 8 an embodiment of the vehicle according to the invention in a schematic illustration.

FIG. 8 shows a vehicle 200 having a seat ventilation system 100. The seat ventilation system 100 comprises a vehicle seat 102, the vehicle seat 102 having two cushion bodies 104, 106. The cushion body 104 is a seat cushion. The cushion body 106 is a backrest. A ventilation zone is located in each of the cushion bodies 104, 106, via which ventilation zone the seat surface can be ventilated.

The seat ventilation system 100 comprises a flow generator 108 designed as a fan, which flow generator 108 is arranged at a distance from a fluid distribution device 10 of the seat ventilation system 100. The fluid distribution device 10 has two actuating drives, not shown, via which two hollow elements 24a, 24b of the fluid distribution device 10 can be rotated. The actuators are designed as stepper motors. The actuators are connected to a control device 110 which controls the actuators as a function of the ambient temperature and/or a set target temperature. For example, the control device 110 and the actuators of the fluid distribution device 10 are connected to one another via a bus system, in particular a LIN bus system. The seat ventilation system 100 illustrated can furthermore have a temperature control device, by means of which the air flow provided to the ventilation zones can be pre-tempered. For example, the temperature control device allows the air flow to be heated and/or cooled so that a cooling and/or heating function can be implemented.

REFERENCE NUMBER 10 fluid distribution device
12 distributor housing
14 receiving body
16 housing cover
18 fluid inlet opening
20a, 20b fluid outlet openings
22 fluid outlet opening
24a, 24b hollow elements
26a, 26b seals
28 fastening elements
30a, 30b walls
32a, 32b fluid-passage openings
34a, 34b fluid-passage openings
36a, 36b fluid-passage openings
38a, 38b fluid-passage openings
40a, 40b fluid-passage openings
42a, 42b fluid-passage openings
44 housing interior
46a, 46b rotary actuation device
100 seat ventilation system
102 seat
104 cushion body
106 cushion body
108 flow generator
110 control devices
200 vehicle

The invention claimed is:
1. A fluid distribution device comprising:
a distributor housing having at least one fluid inlet opening and at least one fluid outlet opening; and
at least one rotary, elongated hollow element having a wall that has one or more fluid-passage openings, wherein a fluid flow through the distributor housing is changed by rotating the at least one rotary, elongated hollow element, wherein the at least one rotary, elongated hollow element has a length that extends along its longitudinal axis, and wherein the wall of the at least one rotary, elongated hollow element has a plurality of axially spaced fluid-passage openings;

wherein the at least one rotary, elongated hollow element includes a first rotary, elongated hollow element and a second rotary, elongated hollow element, each having a wall that includes one or more of the one or more fluid-passage openings, wherein the fluid flow through the distributor housing can be changed by rotating the first, rotary elongated hollow element and the second rotary, elongated hollow element; and wherein the distributor housing has at least one first fluid outlet opening and at least one second fluid outlet opening, wherein the fluid flow through the at least one first fluid outlet opening and the fluid flow through the at least one second fluid outlet opening can be individually controlled by rotating the first, rotary elongated hollow element and the second rotary, elongated hollow element wherein in one operating condition, the fluid flow is configured to:

enter the distributor housing through the at least one fluid inlet opening;

enter the first rotary, elongated hollow element;

enter the second rotary, elongated hollow element;

be redirected in opposing lateral directions;

be redirected to re-enter the first rotary, elongated hollow element; and exit the distributor housing through the at least one first fluid outlet opening.

2. The fluid distribution device according to claim 1, wherein a free flow cross-section of the one or more fluid-passage openings can be changed by rotating the at least one rotary, elongated hollow element.

3. The fluid distribution device according to claim 1, wherein the one or more fluid-passage openings are located in a circumferential outer surface of the at least one rotary, elongated hollow element.

4. The fluid distribution device according to claim 1, wherein the at least one fluid outlet opening can be shut off by rotating the at least one rotary, elongated hollow element.

5. The fluid distribution device according to claim 1, wherein the at least one rotary, elongated hollow element is arranged in sections inside of the distributor housing and in sections outside of the distributor housing.

6. The fluid distribution device according to claim 1, wherein the fluid distribution device includes a rotary actuation device, which is arranged at least partially outside of the distributor housing and via which the at least one rotary, elongated hollow element can be rotated.

7. The fluid distribution device according to claim 1, wherein the at least one first fluid outlet opening and the at least one second fluid outlet opening can be shut off simultaneously and/or individually by rotating the first, rotary elongated hollow element and the second rotary, elongated hollow element.

8. The fluid distribution device according to claim 1, wherein the wall of the at least one rotary, elongated hollow element has a pair or a plurality of pairs of opposite fluid-passage openings.

9. The fluid distribution device according to claim 1, wherein the fluid distribution device includes at least one actuator, for rotating the at least one rotary, elongated hollow element.

10. The fluid distribution device according to claim 1, wherein at least two of the plurality of axially spaced fluid-passage openings have different lengths.

11. The fluid distribution device according to claim 1, wherein at least two of the plurality of axially spaced fluid-passage openings have substantially equal lengths.

12. The fluid distribution device according to claim 6, wherein the rotary actuation device is rotated manually.

13. The fluid distribution device according to claim 1, wherein in one operating condition, the fluid flow is configured to:

enter the distributor housing through the at least one fluid inlet opening;

enter the first rotary, elongated hollow element;

be redirected in opposing lateral directions; and exit the distributor housing through the at least one first fluid outlet opening.

14. The fluid distribution device according to claim 1, wherein in one operating condition, the fluid flow is configured to:

enter the distributor housing through the at least one fluid inlet opening;

enter the first rotary, elongated hollow element;

enter the second rotary, elongated hollow element;

exit the distributor housing through the at least one second fluid outlet opening.

15. A seat ventilation system, having:

at least one seat, which has one or more ventilation zones; and a feed device to provide the one or more ventilation zones of the at least one seat with an air flow;

wherein the feed device has the fluid distribution device according to claim 1.

16. The seat ventilation system according to claim 15, wherein the fluid distribution device is arranged and/or fastened in or on a cushion body of the at least one seat.

17. A vehicle, having the seat ventilation system according to claim 15.

* * * * *